L. BROWN.
AUTOMOBILE.
APPLICATION FILED OCT. 3, 1912.
1,116,791.  Patented Nov. 10, 1914.
4 SHEETS—SHEET 3.
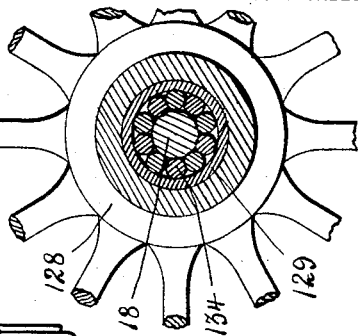
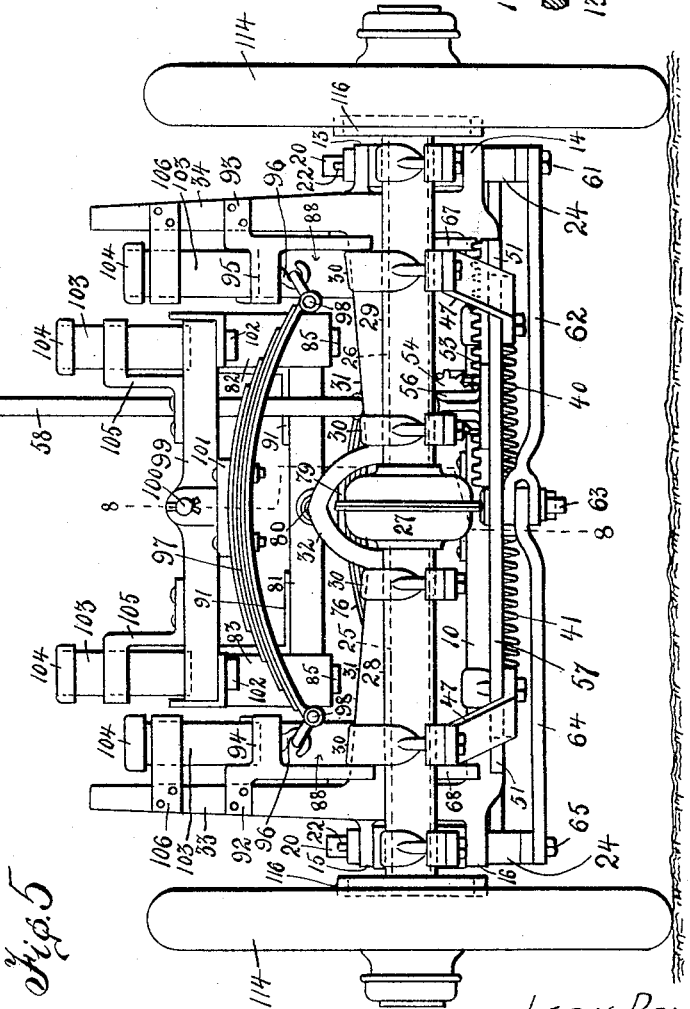
Witnesses
Inventor
LEROY BROWN,
By
Attorneys

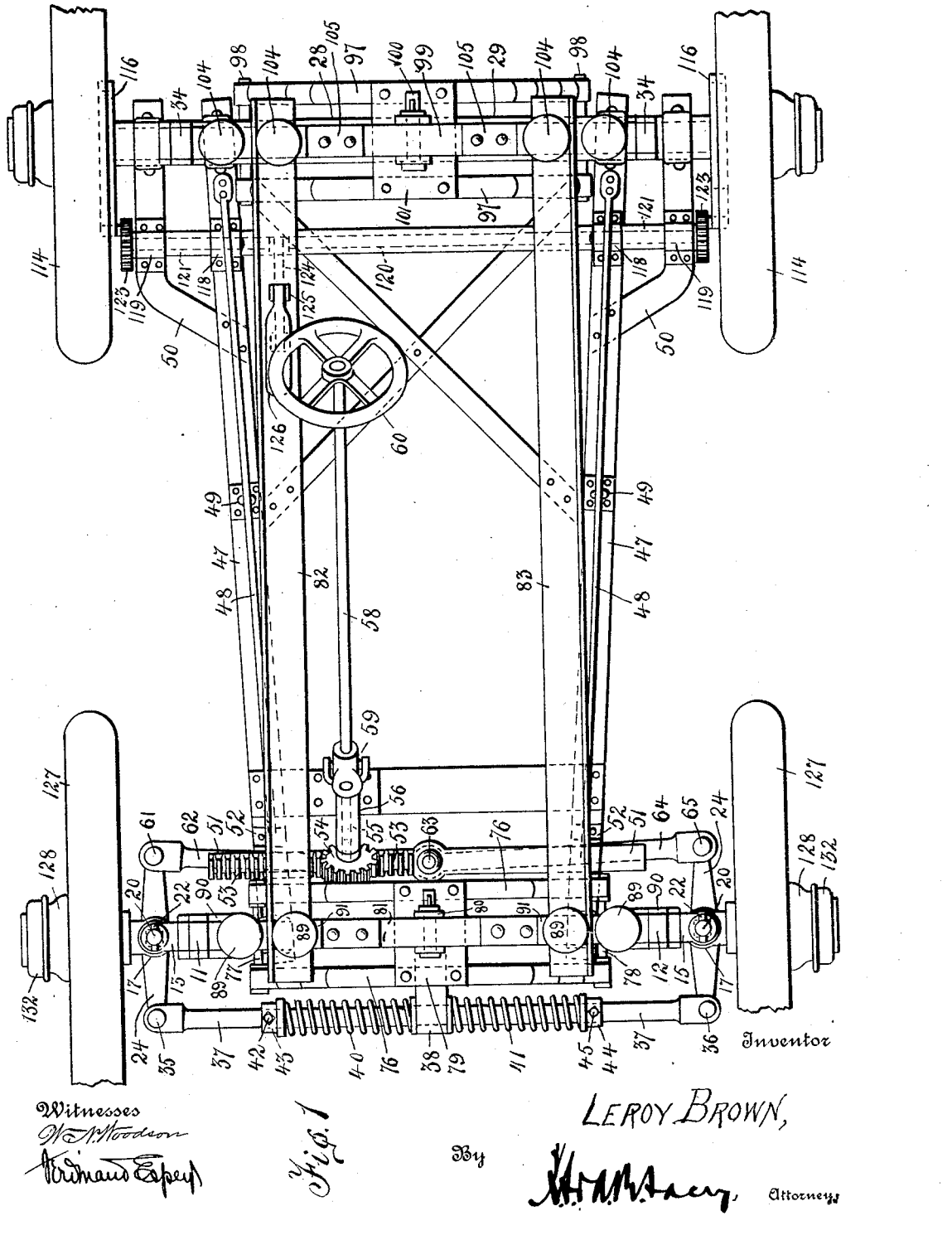

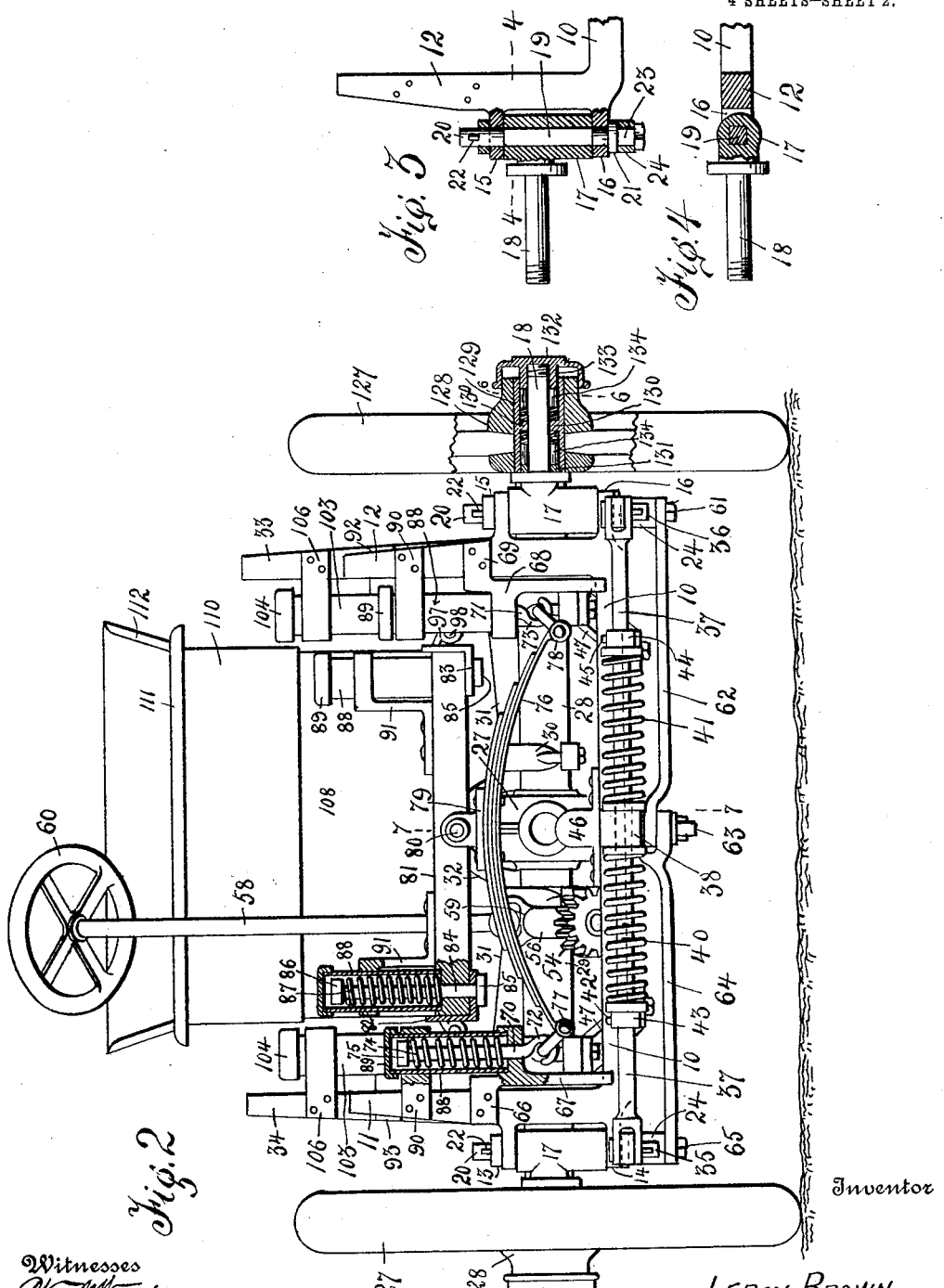

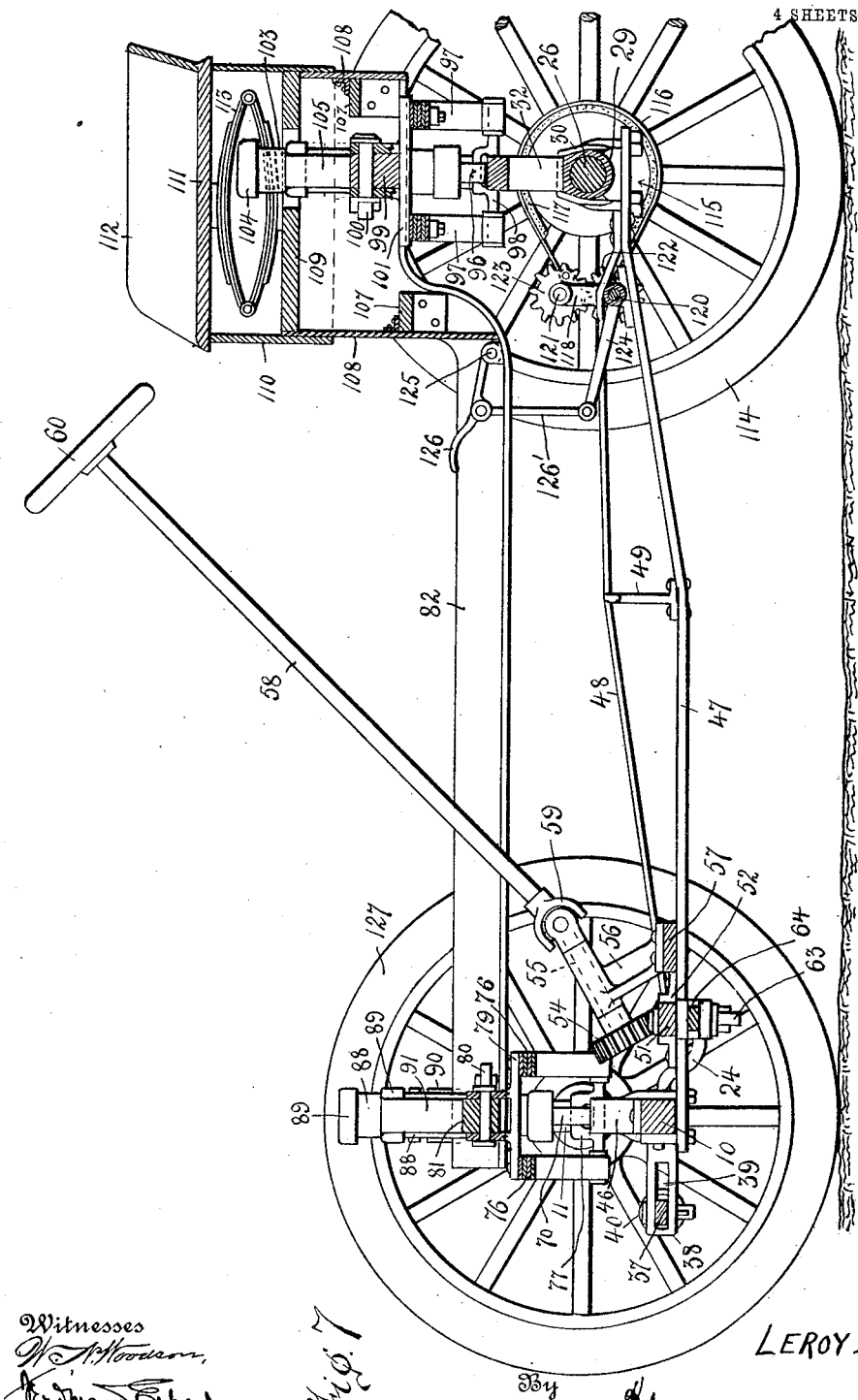

UNITED STATES PATENT OFFICE.

LEROY BROWN, OF DAYTON, WASHINGTON, ASSIGNOR OF ONE-FOURTH TO HEZEKIAH N. BROWN, OF DAYTON, WASHINGTON.

AUTOMOBILE.

1,116,791. Specification of Letters Patent. Patented Nov. 10, 1914.

Application filed October 3, 1912. Serial No. 723,752.

*To all whom it may concern:*

Be it known that I, LEROY BROWN, a citizen of the United States, residing at Dayton, in the county of Columbia and State of Washington, have invented certain new and useful Improvements in Automobiles, of which the following is a specification.

This invention relates to improvements in automobiles, more particularly to the running gear portions of vehicles of this character, and has for one of its objects to improve the construction and increase the efficiency and utility of devices of this character.

Another object of the invention is to provide a device of this construction having an improved arrangement of springs whereby the jars and concussions which are encountered by the driving wheels will be absorbed and not transmitted to the running gear or the passengers when applied to passenger-transporting vehicles or to freight or other articles when employed in connection with freight vehicles or the like.

Another object of the invention is to provide an improved construction of steering gear in coaction with the other portions of the apparatus.

With these and other objects in view, the invention consists in certain novel features of construction as hereafter shown and described, and then specifically pointed out in the claims, and in the drawings illustrative of the preferred embodiment of the invention: Figure 1 is a plan view of the improved device with the body, seats, and engine removed; Fig. 2 is a front elevation partly in section; Fig. 3 is a sectional detail of one of the forward swivel axles illustrating its construction; Fig. 4 is a section on the line 4—4 of Fig. 3; Fig. 5 is a rear elevation with the seat removed; Fig. 6 is an enlarged section on the line 6—6 of Fig. 2; Fig. 7 is a side elevation with the forward gear in section on the line 7—7 of Fig. 2 and the rear gear in section on the line 8—8 of Fig. 5.

Corresponding and like parts are referred to in the following description and indicated in all the views of the drawings by the same reference characters.

The forward axle is formed with an intermediate body portion 10 upturned at the ends as shown at 11—12, and with lugs 13—14 directed outwardly from the upturned portion 11, and similar lugs 15—16 directed outwardly from the upturned portion 12 of the axle. Extending respectively between the lugs 13—14 and 15—16 are head portions 17 of the forward axle journal one of which is shown at 18 in Figs. 2, 3 and 4.

The heads 17 are each longitudinally bored, the bore being preferably square transversely to receive the squared portion 19 of a relatively heavy pin 20. The pins 20 are each provided with a stop collar 21 bearing against the lower ends of the lugs 14 and 16. The pins 20 are each retained in position by a relatively heavy key 22 extending through its upper end and bearing against the upper end of the lugs 13 and 15. At their lower end each pin 20 is provided with a square bearing 23 to respectively receive steering arms 24. By this arrangement the pins 20 are rigidly coupled in the heads 17. By this simple arrangement it will be obvious that when the steering arms are actuated the axle journals 18 will be moved therewith as hereafter more fully explained.

Pivotally connected at its ends at 35—36 to the outer ends of the steering arms 24 is a rod 37, and connected to the forward axle 10 is a guide member 38 having a longitudinal slot 39 through which the rod 37 extends loosely. Surrounding the rod 37 and bearing against opposite sides of the guide member 38, are springs 40—41. Adjustably secured by a set screw 42 to the rod 37, is a stop collar 43 against which the spring 40 bears at its outer end, while a similar stop collar 44 is adjustably secured to the rod by a set screw 45 and bears against the spring 41 at its outer end. By this means the rod 37 is maintained yieldably in its central position and holds the steering arms 24 in a correspondingly central position. By this simple arrangement the steering wheels are yieldably maintained normally in position in parallel relations, or in position to guide the vehicle in a straight line forwardly and to return the wheels automatically to their central and forwardly directed position after being released by the steering mechanism, as hereafter more fully explained.

The rear axle comprises body portions 25—26 having axle journals on their outer ends and spaced apart at their inner ends and supporting the differential gear within a casing 27, the gear not being shown as it forms no part of the present invention.

Surrounding the body portions 25—26 of the rear axle are tubular supporting members 28—29 and mounted upon these tubular members and secured thereto by clips 30 or other suitable fastening devices, is a false axle 31, having an upwardly curving central portion 32 to bear over the casing of the differential gear and likewise provided with upturned terminals 33—34, the latter corresponding closely to the upturned portions 11—12 of the forward axle. The upwardly curved portion 32 also serves as a bumper to the rear springs, while a similar bumper 46 for the forward springs is connected to the central portion 10 of the forward axle. The central portion 10 of the forward axle is coupled to the tubular members 28—29 of the rear axle by reach members 47, the latter being preferably coupled to the axles by suitable clips, as shown. The reach members are supported from downward deflection by brace rods 48 and supports or struts 49, as shown. The rear axle is further supported by lateral braces 50 which couple the reaches with the rear axle. By this means a very stiff and strong frame is produced in which a relatively small amount of material is employed, and so distributed as to secure support in all directions so that the severe strains to which devices of this character are subjected, will be effectually resisted and the displacement of the parts correspondingly prevented.

Supported upon the axle braces 47 is a bar 51 and held in position by straps or bearings 52. By this means the bar is held from movement vertically or longitudinally of the reach members, while at the same time free to slide transversely of the frame. Supported upon the upper face of the bar 51, is a gear rack 53 with which a gear pinion 54 engages. The gear is mounted for rotation upon a short shaft 55 which is supported in a standard 56, the latter being in turn supported upon a transverse bearing member 57 supported upon the reaches 47. The steering rod 58 is coupled to the shaft 55 by a universal joint 59 and is provided with the usual steering wheel 60. By this simple means it will be obvious that when the rod 58 is rotated the bar 51 will be moved transversely of the frame. Pivoted at 61 to the inner end of one of the steering arms 24, is a connecting rod 62 which is pivoted at its inner end at 63 to the bar 51. A similar rod 64 is pivoted at 65 at its outer end to the inner end of the other steering arm 24 and pivoted at its inner end to the pin 63 of the arm 51. By this simple means it will be obvious that an effectual steering device is produced whereby the forward wheels may be cramped to any required extent against the resistance of the springs 40—41, and at the release of the steering gear the forward wheels will be automatically returned to their forwardly directed position, as above described.

Connected at 66 to the upturned portion 11 of the forward axle, is a bracket 67, while a similar bracket 68 is connected at 69 to the upturned portion 12 of the forward axle. Slidably disposed through the bracket 67 is a rod 70, while a similar rod 71 extends through the bracket 68. At its lower end the rod 70 is provided with a hook 72, while a similar hook 73 is disposed at the lower end of the rod 71. At their upper ends the rods 70 and 71 are each provided with a head beneath which the upper ends of coil springs engage, the lower ends of the springs bearing upon the upper face of the bracket. It will be understood that each of the rods 70 and 71 is provided with one of the springs, but as they are precisely alike, one only is shown at the left in Fig. 2, and indicated by the character 74, while the head or enlargement at the upper end of the pin is indicated by the character 75. Extending between the hooks 72 and 73, are relatively heavy leaf springs 76 which are coupled at their outer ends by links 77 and 78 respectively to the hooks 72 and 73. The springs 76 are connected centrally thereof to a coupling plate 79, and coupled at 80 to the plate 79, is a bolster beam 81. At its outer ends the bolster extends over the main side rails 82—83 of the supporting frame, the side rails being preferably formed of L-bars as shown. Extending through the bolster 81 at each end, and likewise through the lower webs of the side rails 82—83, is a vertical pin, one of which is represented at 84, and each with an enlarged lower end 85 bearing against the lower web of the side rail. Each of the pins 84 is also provided with an enlarged head 86 and surrounded by a coil spring 87 bearing at its ends respectively beneath the head 86, and against the upper face of the bolster 81, the latter being preferably enlarged laterally and with a shallow socket in the enlarged portion to receive the lower end of the spring. Surrounding each of the pins 70 and 71, and likewise surrounding the springs 74, is a tubular guard 88, while similar tubular guards surround the pins 84 and the springs 87. The tubular guards are provided respectively with caps 89. By this means the springs are protected from the elements and from dust and moisture. The tubular guards of the pins 70—71 are supported in position by straps 90 from the upturned portions 11—12 of the forward axle, while the tubular guards of the pins 84 are supported by brackets 91 rising from the bolster 81.

Supported at 92 and 93, from the upwardly directed portions 33—34 of the false axle 31, are supporting brackets 94 and 95 and extending downwardly through each bracket, is a pin similar to the pins 70 and 71 and each having a terminal hook 96. The pins of the brackets 94—95 are surrounded respectively by coil springs which bear upon the brackets, and are precisely like the springs 77 and 87 and it is not thought necessary to further illustrate these devices. Extending between the pins of the brackets 94—95 are relatively heavy leaf springs 97, the spring being coupled by links 98 respectively to the hooks 96. A rear bolster 99 is connected at 100 to a coupling plate 101 which carries the springs 97. The bolster 99 extends at its ends over the rear ends of the side rails 82—83. Extending through the ends of the bolsters 99 and likewise through the lower webs of the side rails 82—83, are pins similar to the pins 84, and provided with enlarged lower ends 102 which bear beneath the side rails. The pins are provided with coil springs bearing upon the bolster 99 in the same manner as the springs 87 bear upon the forward bolster 81, but as these springs are precisely alike, it is not thought necessary to illustrate them. Bearing upon the bolster 99, at its ends are tubular cover members 103 which cover the springs and protect them from the elements. The tubular cover members are each provided with a shielding cap 104. The tubular members 103 are each supported by a bracket 105 from the bolster 99. The tubular guards 103 are supported in position from the upturned portion 33—34 of the false axle by straps 106.

The seats and floor of the vehicle are carried by the side rails 47—48 and vehicle may be constructed to support any required number of seats, but for the purpose of illustration one seat only is shown and consists in a base member 107 preferably of wood and carries a vertical shell portion 108 preferably of sheet metal. The shell portion 108 is preferably oblong and corresponds substantially to the outline of an ordinary vehicle seat. At its upper end the shell 108 is provided with a supporting member 109 also preferably of wood. An upper shell 110 telescopically engages the lower shell 108 and is provided with a cushion-supporting member or seat 111 at its upper end. The member 108 is surrounded by the usual cushion-supporting frame 112, while springs 113 are located between the members 108 and 110. The seat member is preferably located above the rear axle, but may be located at other points, as may be preferred.

Connected to the rear wheels 114, are the usual brake disks one of which is represented at 115, and surrounded by a flexible brake band 116 and yieldable brake shoe lining 117. Rising from the reach members 47 near their rear ends in advance of the rear axle, are standards 118, while similar standards 119 are mounted upon the braces 50, the standards being provided with bearings in their upper ends through which a shaft or rod represented at 120 is mounted for rotation. Mounted for rotation in the standards and spaced above the shaft 120, are stub shafts 121, the stub shafts extending through the standards, while the shaft 120 extends from side to side of the machine and through both sets of the standards. Mounted upon each end of the shaft 120, is a gear wheel one of which is represented at 122, while similar gear wheels 123 are connected respectively to the shafts 121 and mesh with the gears 122. Connected to the shaft 120, is an arm 124, and mounted to swing at 125 upon the frame member 82, is a foot lever 126 which is connected by a link 126' to the arm 124. The terminals of the brake strap 116, are connected respectively to the gears 122 and 123 as shown. By this means it will be obvious that when the foot lever 126 is depressed the arm 124 will rotate the shaft 120 and through the coaction of the gears 122 and 123, strain will be imparted to the brake strap and the brake applied. The foot lever 126 is located convenient to the foot of the operator upon the seat of the vehicle, as represented in Figs. 1 and 7. By this simple arrangement it will be obvious that a powerful brake is produced which is simple in construction and effective in operation.

At the left of Fig. 2, one of the forward wheels indicated conventionally at 127, is shown partly broken away with the hub indicated conventionally at 128 in section. The interior of the hub is considerably larger than the diameter of the axle journal 18, and is provided with a suitable antifriction bushing 129, the bushing being provided intermediate its ends with an inwardly directed annular stop rib 130. A stop collar 131 surrounds the axle journal 18 at its inner end, and is located within the bushing as shown in Fig. 2. Fitting over the threaded outer end of the axle journal is a cap 132 having an inwardly directed annular sleeve 133 which engages between the bushing and the axle journal near its outer end. By this means two annular spaces are produced between the bushing and the journal and defined by the stop collar 131 the stop rib 130 and the sleeve 133. Mounted within the spaces thus defined between the bushing and the journal are antifriction rollers 134, one set of the rollers bearing against the stop collar 131 and the other set of rollers being against the sleeve 133. Located between the outer set of rollers and the stop rib 130, are springs 135, while similar springs 136 are located between the stop rib and the inner set of rollers. By this simple means it will be obvious that an effectual anti-friction bearing is produced which holds the wheel yieldably in position through the action of the springs while permitting lateral movement of the wheel against the resistance of the springs in event of the wheels being subjected to a lateral pressure or concussion. Thus if the wheel comes in contact with an obstruction which would produce lateral movement thereto, this movement is counteracted by the yieldable nature of the springs, and permits the wheel to move laterally and relieves the running gear from the effect of such obstruction.

In Fig. 6, the hub portion of the improved wheel is shown in transverse section to illustrate the relative arrangement of the parts.

Having thus described the invention, what is claimed as new is:

1. An automobile including a forward axle and a rear axle, each of said axles having spring supports, a bolster coacting with each of said axles, suspension devices movable relative to said spring supports, springs connected respectively to said bolsters and to said suspension devices, other springs connected to said suspension devices and bearing upon said spring supports, a body supporting frame, and means for coupling said body supporting frame to said bolsters.

2. An automobile including a forward axle and a rear axle, each of said axles having spring supports, a bolster coacting with each of said axles, suspension devices movable relative to said spring supports, springs connected respectively to said bolsters and to said suspension devices, other springs connected to said suspension devices and bearing upon said spring supports, other suspension devices movable relative to said bolsters, a body supporting frame connected to said last-mentioned suspension devices, and a spring connected to each of said last-mentioned suspension devices and bearing respectively upon said bolsters.

3. In an automobile, coacting axle shells, a casing for a compensating gear coupled to the confronting ends of said coacting shells, a supporting member bearing upon said axle shells having up-turned terminals, fastening means connecting said supporting member to said axle shells, spring supports carried by the upturned terminals of said supporting member, bolster devices adapted to support an automobile body, springs bearing upon said spring supports, and coupling means between said springs and bolster devices.

4. An automobile including a forward axle and a rear axle, said axles having upturned terminals, brackets carried by the upturned terminals of said axles, rods movable through said brackets, springs supported by said rods, a coupling spring united to said rods, bolster members supported by said coupling springs, a supporting frame, rods extending through said supporting frame and bolster members, and other springs supported by said last-mentioned rods and bearing upon said bolster members.

5. In a vehicle, a forward axle having guideways, a rear axle having guideways, spring supported suspension members operating respectively through said guideways, a forward bolster, a rear bolster, spring supported suspension members operating respectively through said bolsters, a spring connected to said bolster and the suspension members of said forward axle, a spring connected to said rear bolster and the suspension members of said rear axle, and a supporting frame carried by the suspension members of said bolsters.

6. In an automobile, coacting axle shells, a casing for a compensating gear coupled to the confronting ends of said coacting shells, a supporting member bearing upon said axle shells and having up-turned terminals, fastening means connecting said supporting member to said axle shells, brackets connected to said up-turned terminals and having depending portions engaging said supporting member, bolster devices adapted to support an automobile body, springs bearing on said brackets, and coupling means between said springs and bolster devices.

7. An automobile including a forward axle and a rear axle, said axles having upturned terminals provided with spring supports, brackets carried by said upturned axle terminals and spaced from said spring supports, hood devices supported by said brackets and engaging said spring supports, springs within said hood devices and bearing upon said spring supports, bolsters supported by said supporting frame, and means connecting said bolsters and springs.

8. An automobile including a forward axle and a rear axle, each of said axles having spring supports, a reach device connecting said axles, a bolster coacting with each of said axles, suspension devices movable relative to said spring supports, springs connected respectively to said bolsters and to said suspension devices, other springs connected to said suspension devices and bearing upon said spring supports, a body supporting frame, and means for coupling said body supporting frame to said bolsters.

9. In a vehicle, an axle, suspension means movable relative to said axle, a bolster, suspension means movable relative to said bolster, springs connected respectively to said suspension means, a supporting frame, means for coupling said bolster to the suspension means of the axle, and means for coupling the supporting frame to the suspension means of the bolster.

10. An automobile including a forward axle and a rear axle, reach members connecting said axles, a supporting frame, springs supported from said axles, bolster members extending respectively in longitudinal alinement with said axles and supported by said springs, and other springs between said bolster members and frame.

11. An automobile including a forward axle and a rear axle, a supporting body, spring supported suspension devices carried by each of said axles, a bolster coacting with each of said axles, springs arranged to suspend said body from said bolsters, and springs connected to said bolsters and supported by said suspension devices.

12. An automobile including a forward axle and a rear axle having guide members, a supporting body, spring supported suspension devices movable through said guide members, a bolster coacting with each of said axles, springs arranged to suspend said body from said bolsters, and springs connected to said bolsters and supported by said suspension devices.

In testimony whereof I affix my signature in presence of two witnesses.

LEROY BROWN. [L. S.]

Witnesses:
WM. WEATHERFORD,
H. N. BROWN.

Copies of this patent may be obtained for five cents each, by addressing the "Commissioner of Patents, Washington, D. C."